United States Patent
Tong et al.

(10) Patent No.: US 10,861,176 B2
(45) Date of Patent: Dec. 8, 2020

(54) SYSTEMS AND METHODS FOR ENHANCED DISTANCE ESTIMATION BY A MONO-CAMERA USING RADAR AND MOTION DATA

(71) Applicant: GM GLOBAL TECHNOLOGY OPERATIONS LLC, Detroit, MI (US)

(72) Inventors: Wei Tong, Troy, MI (US); Shuqing Zeng, Sterling Heights, MI (US); Mohannad Murad, Troy, MI (US); Alaa M. Khamis, Ontario (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 59 days.

(21) Appl. No.: 16/200,932

(22) Filed: Nov. 27, 2018

(65) Prior Publication Data

US 2020/0167941 A1    May 28, 2020

(51) Int. Cl.
*G06K 9/62* (2006.01)
*G01S 13/86* (2006.01)
*G01S 13/931* (2020.01)
*G06T 7/55* (2017.01)
*G06T 3/20* (2006.01)
*G06T 3/60* (2006.01)

(52) U.S. Cl.
CPC .............. *G06T 7/55* (2017.01); *G01S 13/867* (2013.01); *G01S 13/931* (2013.01); *G06K 9/6289* (2013.01); *G06T 3/20* (2013.01); *G06T 3/60* (2013.01); *G06T 2207/10028* (2013.01); *G06T 2207/10044* (2013.01); *G06T 2207/20081* (2013.01); *G06T 2207/20221* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 2019/0122378 A1* | 4/2019 | Aswin | G06N 3/0418 |
| 2019/0147245 A1* | 5/2019 | Qi | G06K 9/00208 382/103 |
| 2019/0349571 A1* | 11/2019 | Herman | B60R 1/00 |
| 2020/0074266 A1* | 3/2020 | Peake | G05D 1/0231 |

* cited by examiner

*Primary Examiner* — Idowu O Osifade
(74) *Attorney, Agent, or Firm* — Lorenz & Kopf LLP

(57) ABSTRACT

Systems and methods for depth estimation of images from a mono-camera by use of radar data by: receiving, a plurality of input 2-D images from the mono-camera; generating, by the processing unit, an estimated depth image by supervised training of an image estimation model; generating, by the processing unit, a synthetic image from a first input image and a second input image from the mono-camera by applying an estimated transform pose; comparing, by the processing unit, an estimated three-dimensional (3-D) point cloud to radar data by applying another estimated transform pose to a 3-D point cloud wherein the 3-D point cloud is estimated from a depth image by supervised training of the image estimation model to radar distance and radar doppler measurement; correcting a depth estimation of the estimated depth image by losses derived from differences: of the synthetic image and original images; of an estimated depth image and a measured radar distance; and of an estimated doppler information and measured radar doppler information.

20 Claims, 8 Drawing Sheets

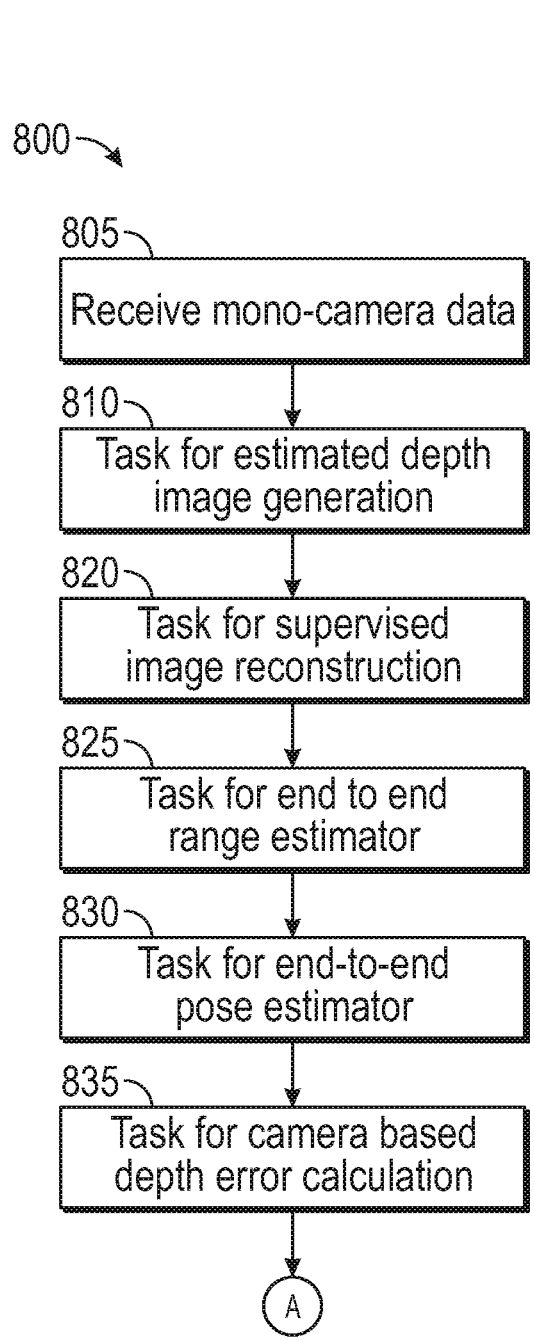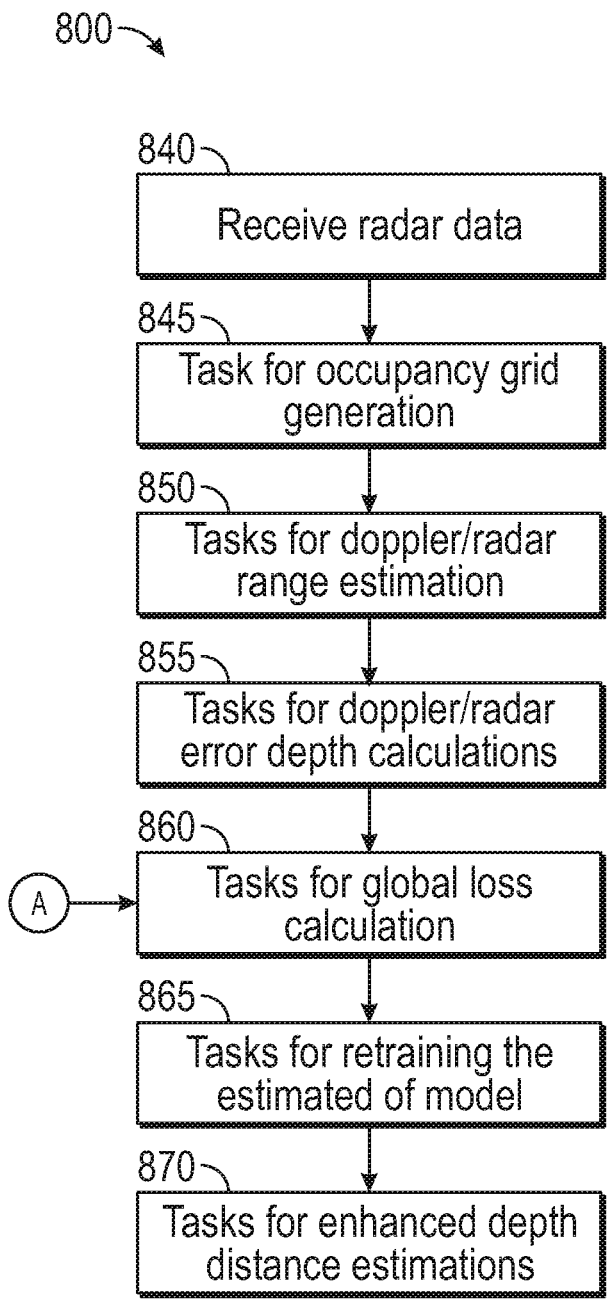
FIG. 8A
FIG. 8B

SYSTEMS AND METHODS FOR ENHANCED DISTANCE ESTIMATION BY A MONO-CAMERA USING RADAR AND MOTION DATA

BACKGROUND

The technical field generally relates to image depth estimation systems and methods, and more particularly relates systems and methods for generating high resolution depth images based on monocular camera data for stationary and moving obstacle avoidance applications by training a supervised model based on fused data from heterogenous sources without requiring manual data labeling.

Depth estimation is an integral task in applications of today's vehicular systems such as collision avoidance systems, Further, autonomous and semi-autonomous vehicles require highly accurate estimations of depth for safety and functionality. Depth estimations using a monocular camera is challenging because during an imaging procedure, the distance information in the 3-D context is discarded when forming the 2-D image. Thus, in order to estimate the missing distance information from the 2-D image, certain assumptions have to be made. However, in reality, such assumptions may not be sufficiently correct which entails that the depth/distance estimation realized from purely a 2-D image not to be accurate and reliable.

Furthermore, other desirable features and characteristics of the present invention will become apparent from the subsequent detailed description and the appended claims, taken in conjunction with the accompanying drawings and the foregoing technical field and background.

SUMMARY

A system and method for enhancing depth estimation of an image from a mono-camera by use of radar data from supervised training of a depth estimation model in a vehicle is disclosed.

In one embodiment, a method for enhanced depth estimation of images from a mono-camera by use of radar data is disclosed. The method includes: receiving, by a processing unit disposed in a vehicle, a plurality of input images from the mono-camera coupled to a vehicle wherein each input image is a two-dimensional (2-D) image of a scene surrounding the vehicle; generating, by the processing unit, an estimated depth image by supervised training of an image estimation model; generating, by the processing unit, a synthetic image from a first input image and a second input image from the mono-camera by applying an estimated transform pose; comparing, by the processing unit, an estimated three-dimensional (3-D) point cloud to radar data by applying another estimated transform pose to a 3-D point cloud wherein the 3-D point cloud is estimated from a depth image by supervised training of the image estimation model to radar distance and radar doppler measurement; correcting a depth estimation of the estimated depth image by losses derived from differences of the synthetic image and original images; correcting the depth estimation of the estimated depth image by losses derived from differences of an estimated depth image and a measured radar distance; and correcting the depth estimation of the estimated depth image by losses derived from differences of an estimated doppler information and measured radar doppler information.

In various embodiments, the first input image is a source view $I_s$ between $<I_1, \ldots I_n>$ and the second input image is a target view of $I_t$ ($1 \leq t \leq N$, $s \neq t$). The method, further includes: correcting the depth estimation by calculating the loss from a depth error of the input image derived by the function of:

$$\ell_{vs} = \frac{1}{wh}\sum_{t}\sum_{p}|I_t(p) - \hat{I}_s(p)|$$

wherein $\hat{I}_s$ is the source view $I_s$ warped to the target view based on an estimated depth image of an estimated depth $\widehat{D_s}$ and an estimated transform pose R, T of the source view image and target view images. The method, further includes: correcting the depth estimation by calculating the loss from a radar depth error derived by a function of:

$$\ell_{depth} = \frac{1}{n}\sum_{x}\sum_{y}\sum_{j\in\mathbb{N}}w_j(r_{xy} - \hat{r}_j)$$

wherein n is a total number of radar points compared to each point of the 3-D point cloud wherein $\mathbb{N}$ is a neighborhood of (x,y) and r is a range measurement from a radar sensor and $\hat{r}$ is an estimated image depth wherein w is a corresponding weight. The method, further includes: correcting the depth estimation by calculating the loss from a doppler radar depth error. The method, further includes: calculating the loss of the doppler radar depth error derived by a function of:

$$\ell_{doppler} = \frac{1}{n}\sum_{x}\sum_{y}\sum_{j\in\mathbb{N}}w_j(rr_{xy} - \hat{rr}_j)$$

wherein n is a total number of radar points compared to the 3-D point cloud wherein $\mathbb{N}$ is the neighborhood of (x,y), rr is a radar doppler measurement of and $\hat{rr}$ is an estimated doppler information wherein w is the corresponding weight. The method, further includes: correcting the depth estimation by calculating the loss derived by a function of: $\ell_{final} = \alpha_1 \ell_{vs} + \alpha_2 \ell_{depth} + \alpha_3 \ell_{doppler} + \alpha_4 \ell_{smooth/reg}$ wherein $\ell_{smooth/reg}$ is a smooth regularization term, and $\alpha_i$ is a weighting parameter. The $\ell_{smooth/reg}$ is an optional term.

In another embodiment, a system including: a depth estimation processing unit disposed in a vehicle including one or more processors configured by programming instructions encoded on non-transient computer readable media is provided. The system includes: the depth estimation processing unit configured to: receive a plurality of input images from a mono-camera coupled to the vehicle wherein each input image is a two-dimensional (2D) image of a scene surrounding the vehicle; generate an estimated depth image by comparisons between each input image of a set of the plurality of the input images; generate a synthetic image from a first input image and a second input image from the mono-camera by applying an estimated transform pose wherein the synthetic image is formed by supervised training of an image estimation model; compare an estimated three-dimensional (3-D) point cloud to radar data from a radar of the vehicle by applying another estimated transform pose to a 3-D point cloud wherein the 3-D point cloud is compared by supervised training of the image estimation model to radar distance and a radar doppler measurement;

and correct a depth estimation of the estimated depth image by losses derived from differences of: the synthetic image and original images, an estimated depth image and a measured radar distance, and an estimated doppler information and measured radar doppler information.

In various embodiments, the first input image is a source view $I_s$ between $<I_1, \ldots I_n>$ and the second input image is a target view of $I_t$ ($1 \leq t \leq N$, $s \neq t$). The system, further including: correct the depth estimation by calculating the loss from a depth error of the input image derived by the function of:

$$\ell_{vs} = \frac{1}{wh} \sum_t \sum_p |I_t(p) - \hat{I}_s(p)|$$

wherein $\hat{I}_s$ is the source view $I_s$ warped to the target view based on an estimated depth image of an estimated depth $\widehat{D}_s$ and an estimated transform pose R, T of the first input image and the target view images. The system, further including: correct the depth estimation by calculating the loss from a radar depth error derived by a function of:

$$\ell_{depth} = \frac{1}{n} \sum_x \sum_y \sum_{j \in \mathbb{N}} w_j(r_{xy} - \hat{r}_j)$$

wherein n is a total number of radar points compared to each point of the 3-D point cloud wherein $\mathbb{N}$ is a neighborhood of (x,y) and r is a range measurement from a radar sensor and $\hat{r}$ is the estimated image depth wherein w is a corresponding weight. The system, further including: correct the depth estimation by calculating the loss from a doppler radar depth error. The system, further including: calculate the loss of the doppler radar depth error derived by a function of:

$$\ell_{doppler} = \frac{1}{n} \sum_x \sum_y \sum_{j \in \mathbb{N}} w_j(rr_{xy} - \hat{rr}_j)$$

wherein n is a total number of radar points compared to the 3-D point cloud wherein $\mathbb{N}$ is the neighborhood of (x,y), rr is a doppler measurement from a radar sensor and $\hat{rr}$ is an estimated doppler information wherein w is the corresponding weight. The system, further including: correct the depth estimation by calculating the loss derived by a function of: $\ell_{final} = \alpha_1 \ell_{vs} + \alpha_2 \ell_{depth} + \alpha_3 \ell_{doppler} + \alpha_4 \ell_{smooth/reg}$ wherein $\ell_{smooth/reg}$ is a smooth regularization term, and $\alpha_i$ is a weighting parameter. The $\ell_{smooth/reg}$ is an optional term.

In yet another embodiment, a vehicle, including a monocamera, a radar and a depth estimation unit including one or more processors and non-transient computer readable media encoded with programming instructions is provided. The vehicle including: the depth estimation unit is configured to: receive a plurality of input images from a mono-camera coupled to the vehicle wherein each input image is a two-dimensional (2-D) image of a scene surrounding the vehicle; generate an estimated depth image by comparisons between each input image of a set of the plurality of the input images; generate a synthetic image from a first input image and a second input image from the mono-camera by applying an estimated transform pose wherein the synthetic image is formed by supervised training of an image estimation model; compare an estimated three-dimensional (3-D) point cloud to radar data from the radar by applying another estimated transform pose to a 3-D point cloud wherein the 3-D point cloud is compared by supervised training of the image estimation model to radar distance and radar doppler measurements; correct a depth estimation of the estimated depth image by losses derived from differences of the synthetic image and original images; correct the depth estimation of an estimated depth image by losses derived from differences of an estimated depth image and a measured radar distance; and correct the depth estimation of the estimated depth image by losses derived from differences of an estimated doppler information and measured radar doppler information.

The vehicle, further including: the depth estimation unit is configured to: correct the depth estimation by calculating the loss from a depth error of the input image derived by the function of:

$$\ell_{vs} = \frac{1}{wh} \sum_t \sum_p |I_t(p) - \hat{I}_s(p)|$$

wherein $\hat{I}_s$ is a source view $I_s$ warped to a target view based on an estimated depth image of an estimated depth $\widehat{D}_s$ and an estimated transform pose R, T of the first input image and a source view wherein the first input image is a source view $I_s$ between $<I_1, \ldots I_n>$ and the second input image is a source view of $I_t$ ($1 \leq t \leq N$, $s \neq t$). The vehicle, further including: the depth estimation unit is configured to: correct the depth estimation by: calculating the loss from a depth error of the input image derived by the function of:

$$\ell_{vs} = \frac{1}{wh} \sum_t \sum_p |I_t(p) - \hat{I}_s(p)|$$

wherein $\hat{I}_s$ is the source view $I_s$ warped to the target view based on an estimated depth image of an estimated depth $\widehat{D}_s$ and an estimated transform pose R, T of source view image and the target view images; calculating the loss from a radar depth error derived by a function of:

$$\ell_{depth} = \frac{1}{n} \sum_x \sum_y \sum_{j \in \mathbb{N}} w_j(r_{xy} - \hat{r}_j)$$

wherein n is a total number of radar points compared to each point of the 3-D point cloud wherein $\mathbb{N}$ is a neighborhood of (x,y), r is a range measurement from a radar sensor and $\hat{r}$ is the estimated image depth wherein w is a corresponding weight; and calculating the loss of the doppler radar depth error derived by a function of:

$$w\ell_{doppler} = \frac{1}{n} \sum_x \sum_y \sum_{j \in \mathbb{N}} w_j(rr_{xy} - \hat{rr}_j)$$

herein n is a total number of radar points compared to the 3-D point cloud wherein $\mathbb{N}$ is the neighborhood of (x,y), rr is a doppler measurement from the radar sensor and $\hat{rr}$ is an estimated doppler information wherein w is the corresponding weight. The vehicle, further including: the depth estimation unit is configured to: correct the depth estimation by:

calculating a total loss by the function $\ell_{final} = \alpha_1 \ell_{vs} + \alpha_2 \ell_{depth} + \alpha_3 \ell_{doppler} + \alpha_4 \ell_{smooth/reg}$ wherein $\ell_{smooth/reg}$ is a smooth regularization term, and $\alpha_i$ are weighting parameters wherein $\ell_{smooth/reg}$ is an optional term.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
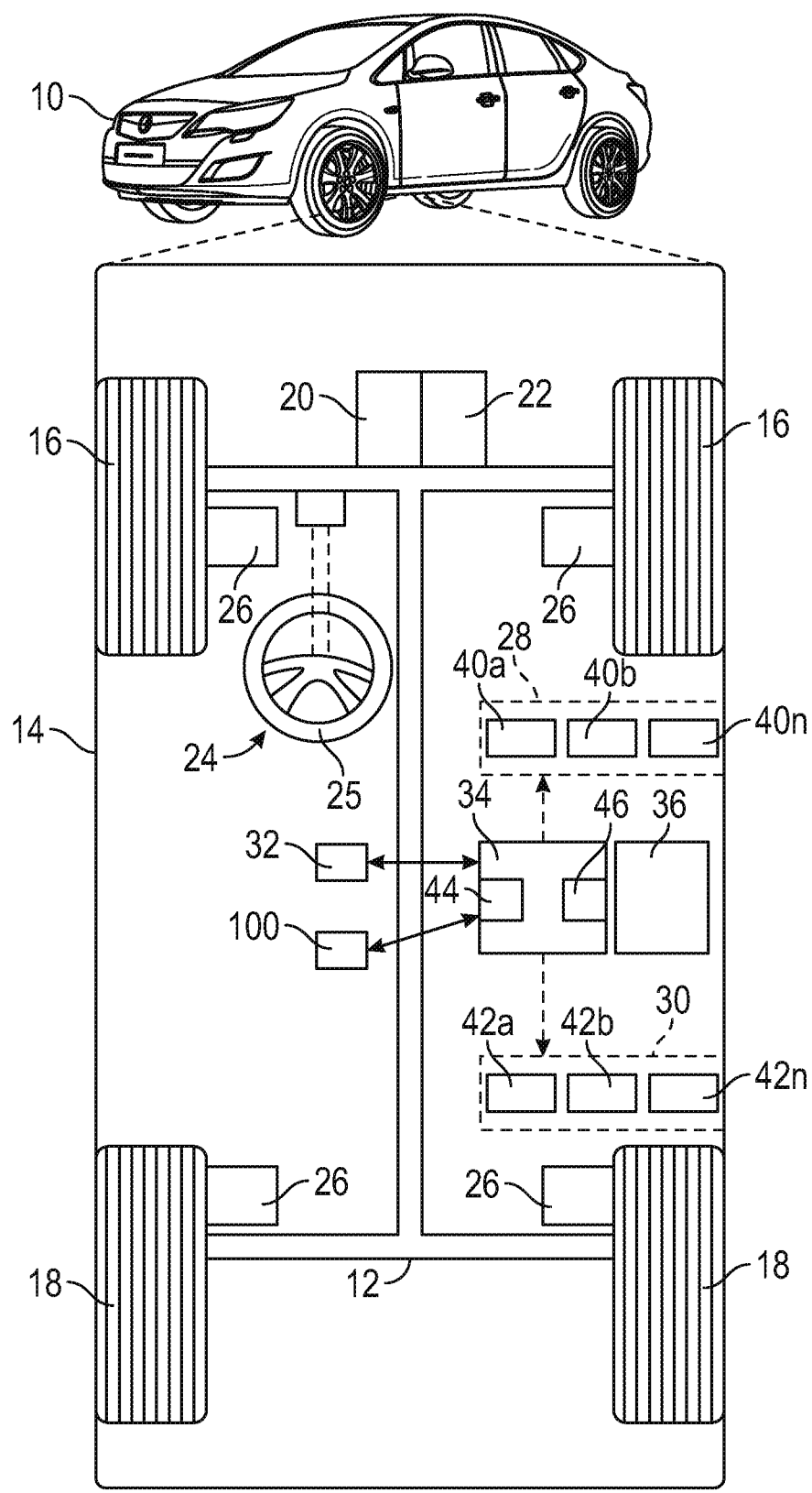
FIG. 1 illustrates a block diagram depicting an example vehicle that may include a processor for estimating depths of obstacles in camera images using a mono-camera depth estimation model in accordance with an embodiment.

The following detailed description is merely exemplary in nature and is not intended to limit the application and uses. Furthermore, there is no intention to be bound by any expressed or implied theory presented in the preceding technical field, background, summary, or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For purposes of this disclosure any references to the self-supervision is considered automated process of supervised learning with feedback based on predicted results. That is an automated task of learning of depth estimations by mapping inputs of training data for developing a mono-camera machine learning (ML) model based on radar and image data of a vehicle. The training model relies on a continuous output of error estimations for mapping of grids and is based on fused heterogenous data received from image and radar devices.

Autonomous and semi-autonomous vehicles are capable of sensing their environment and navigating based on the sensed environment. Such vehicles sense their environment using multiple types of sensing devices such as radar, lidar, image sensors, and the like. In such vehicles the use only of a single mono-camera to perceive and analyze the environment is limited because of depth accuracy and robustness. Also, the use of mono-cameras is limited because mono-cameras lack ability to provide accurate range and velocity information about the objects in the scene.

The lack of distance information is a challenge that must be handled when developing a mono-camera system for use by autonomous or semi-autonomous vehicles. This is because it is not always possible to gain sufficient depth information from a two-dimensional image. The use of machine learning algorithms is a feasible solution to estimate the depth information from images by fusing the information from a mono-camera system together with data from e.g. a radar system. This utilizes the mono-camera's capability of detecting objects in a wide field of view together with the distance information from the radar.

In various embodiments, the present disclosure describes systems and methods for depth estimation of a two-dimensional (2D) image by estimating scene depth in an image and by supervised testing by analyzing perspective transformations over a denoted time period.

In various exemplary embodiments, the present disclosure describes systems and methods for training a model for generating high resolution depth images for obtaining enhanced range and velocity information of objects in an image based on only mono-camera data for stationary and moving objects with the use of global loss error calculations of depth estimations derived from multiple heterogeneous sensor data sources to enable active safety in a vehicle and autonomous driving capabilities.

In various exemplary embodiments, the present disclosure describes systems and methods for training a model for generating high resolution depth images that does not rely on Structure from Motion (SfM) techniques that are inefficient because SfM techniques require significant processing steps of large (x or y) rotation, large field of view and depth variation and continuous camera calibrations.

In various exemplary embodiments, the present disclosure describes systems and methods for training a model for generating high resolution depth images that uses multiple sources (i.e. radar, doppler radar, camera devices etc.) of supervised information from heterogeneous and homogeneous data of image, acoustic and optical data which is used together or separately to avoid added processing steps of manual data labeling of input images.

In various exemplary embodiments, the present disclosure describes systems and methods for training a model for generating high resolution depth images by fusing data of multiple views to reduce data imperfections and increase spatial coverage and reliability of the vehicle depth estimation of the surroundings.

In various exemplary embodiments, the present disclosure describes systems and methods for training a model for generating high resolution depth images by supervision without requiring artificial landmarks markers, pre-made maps or known templates and targets to assess the object's in an image of interest.

In various exemplary embodiments, the present disclosure describes systems and methods for training a model for generating high resolution depth images which is flexible for transferring into different cameras settings by taking into consideration both intrinsic and extrinsic calibration of particular cameras used.

FIG. 1 illustrates a block diagram depicting an example vehicle that may include a processor for estimating depths of obstacles in camera images using a mono-camera depth estimation model 100. In general, the loss error calculations are included in a mono-camera depth estimation model (or simply "system") 100 that determines the estimated depths in scenes for the control of an autonomous vehicle using the mono-camera depth estimation model and the training of the estimation model for calculating accurate depths.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10. The data storage device 32 may be part of the controller 34, separate from the controller 34, or part of the controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a learning or prediction model on an AI chip), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As an example, the system 100 may include any number of additional sub-modules embedded within the controller 34 which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
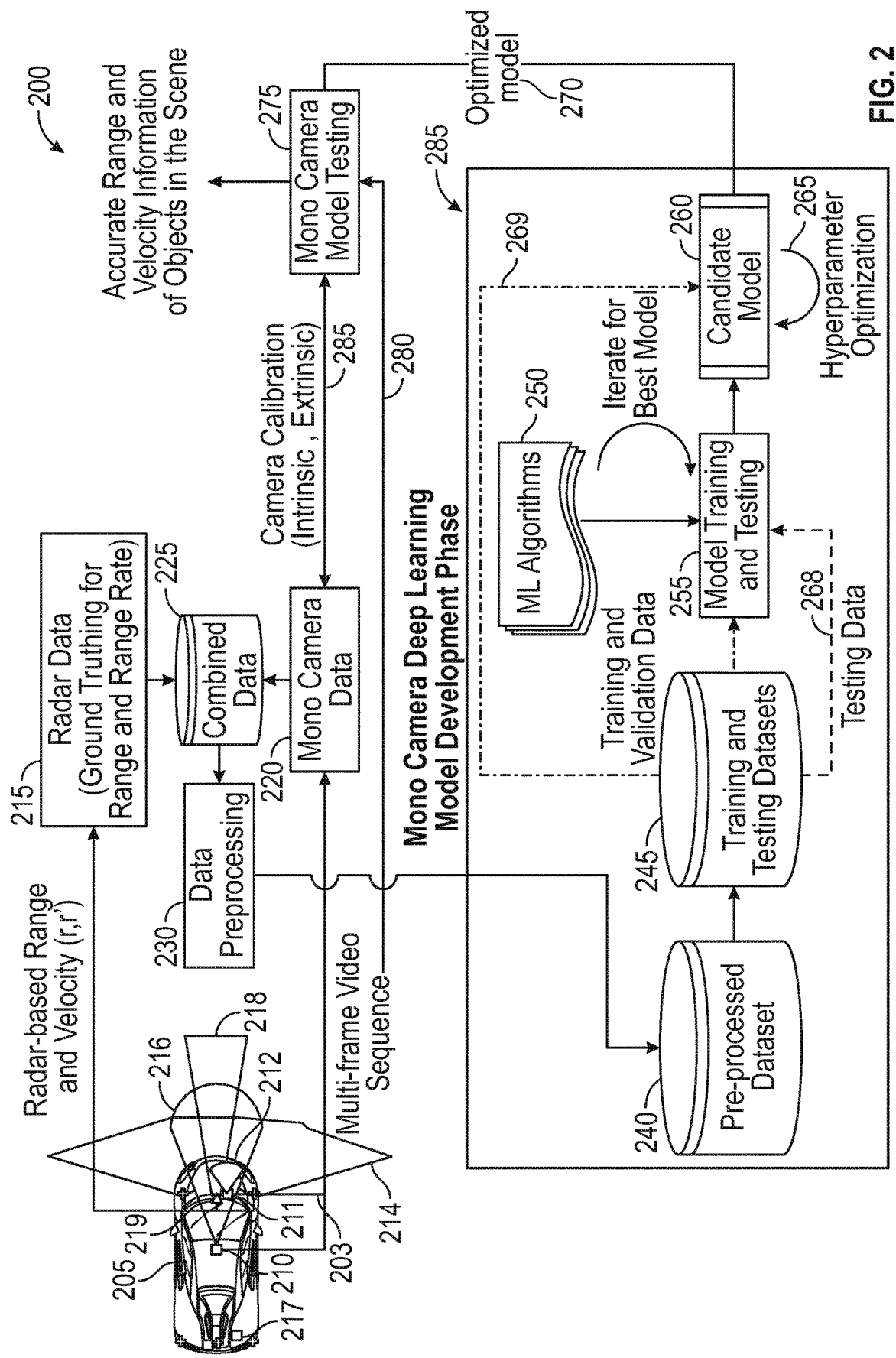
FIG. 2 illustrates a diagram of a camera mounted on a vehicle and the processing of the mono-camera data and the radar data to train a model for depth estimation in images of the mono-camera depth estimation system by self-supervising or supervising learning in accordance with an embodiment.

FIG. 2 illustrates a diagram 200 of a camera mounted on a vehicle and the processing of the mono-camera data and the radar data to train a model for depth estimation in images of the mono-camera depth estimation system by self-supervising or supervising learning in accordance with an embodiment. In FIG. 2, a vehicle 205 has a camera 210 mounted on the vehicle 205 with a field of view 216 in front of the vehicle 205. There is a second camera 211 mounted on the hood or located in the front (i.e. in the grill, front bumper etc.) of the vehicle 205. The camera 210 because it is located at a more elevated location than the second camera 211, has a different field of view 216 than the second camera 211. There is located around the vehicle 205, a set of short range radars 203 placed in the front two corners of the vehicle 205 and at the rear corners as well as an additional short-range radar 203 centered in the middle rear of the trunk or rear bumper of the vehicle 205. Also, there is a long-range radar 219 positioned next to the second camera 211 with a radar range 218 which is further in distance than the longer field of view 216 of the camera 210 and as well as the shorter field of view 212 of the second camera 211 positioned next too. Two short range radars 203 are positioned in the front of the vehicle 205 and have a range 214 depicted in the FIG. 2.

As depicted in FIG. 2, the mono-camera depth estimation system 200 receives long range data and velocity data from at least one of the short-range radars 203 positioned in the front of the vehicle 205 with front facing sensing in the forward direction of the vehicle 205 motion. The mono-camera depth estimation system 200 also receives video data of images from the camera 210 and/or the second camera 211. In various exemplary embodiments, it is contemplated that the video data can be generated from a single mono-camera. The radar data can be either the short-range radar data or long-range radar data. In addition, the short range and/or long-range radar devices can be configuring in variety of radar types including moving target radars, pulse doppler radars etc. In various alternate exemplary embodiments, LIDAR devices or scanning laser devices can be used to generate the radar data. Further, the video data may be used in a radar processing unit 215 and the mono-camera data is received by a mono-camera processing unit 220.

In alternate embodiments, the radar data can also include doppler radar data for loss estimation in error estimation and can combined with loss estimation of the camera data. The radar data provides grounding information for range and range rate. The camera data and radar data are fused together into combined data and stored in a combined data repository 225 for sending for further data processing by a data processing unit 230 further described in FIGS. 3-7. The data processing unit 230 executes a mono-camera training (i.e. deep learning development phase) model 235 by sending the data to a preprocessing device 240 for preprocessing the data by filtering the data for use in training and testing. The training and testing unit splits the preprocessed dataset into training, validation and testing datasets to be used to develop a machine learning model 255 using different ML algorithms 250. A trained model (i.e. candidate model) 260 is produced using the best performing ML algorithm. The trained model 260 is further tuned in recursive or feedback process 265 for hyperparameter optimization to meet the target performance. The optimized model 270 is generated for use in the mono-camera model testing 275. The mono-camera model testing 275 ensures an accurate range and velocity information of objects in the scene with additional processing by the mono-camera model testing 275 which is configured by intrinsic and extrinsic calibration 285 of the mono-camera processing unit 220 (i.e. the particular type, model of camera) for particular types of inputs of the images (i.e. multi-frame video sequence) 280.

Figure 3:
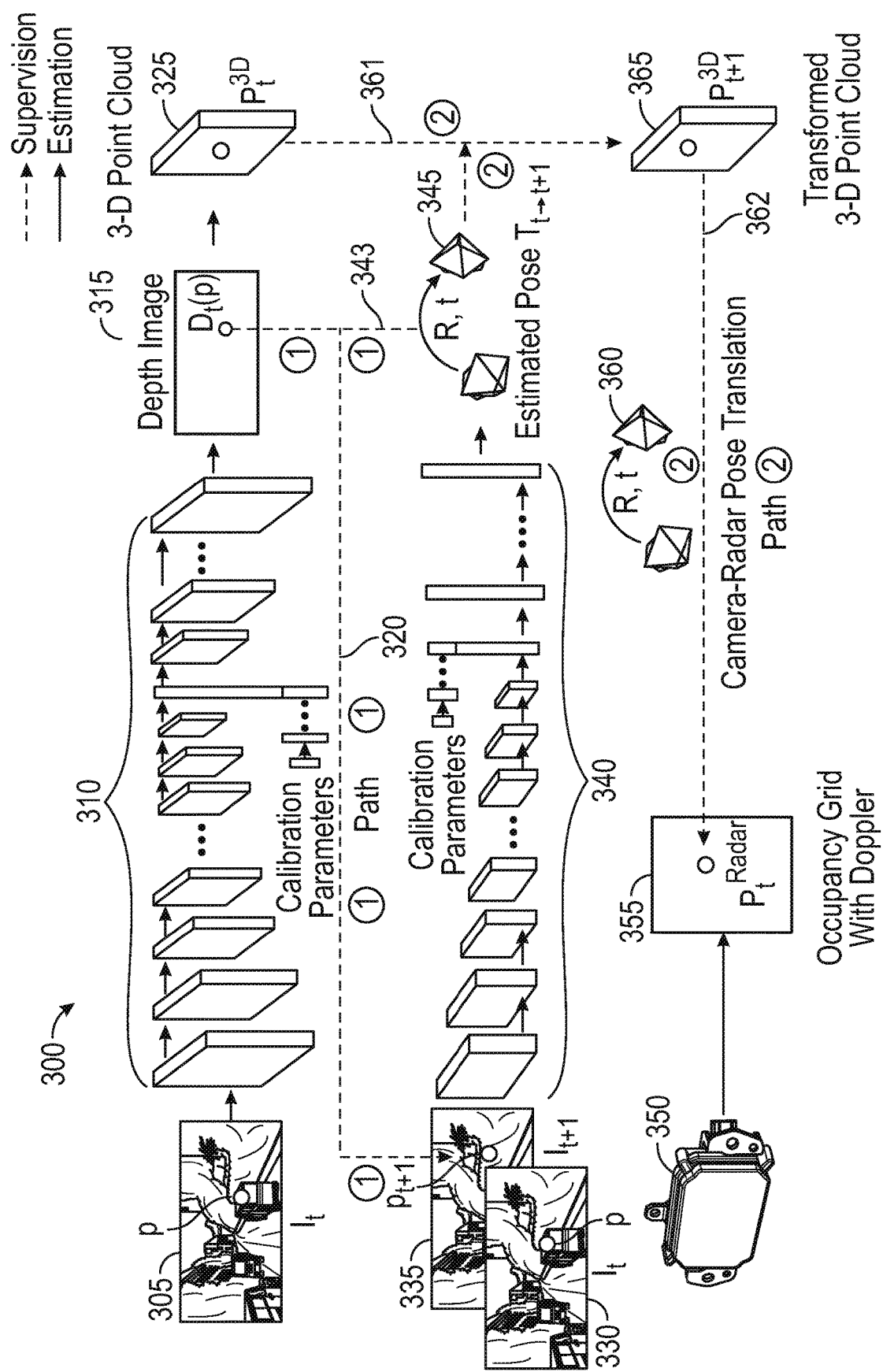
FIG. 3 illustrates a diagram of the system architecture using the trained model for the mono-camera modeling by supervised learning for the estimations of depth in images of the mono-camera depth estimation system in accordance with an embodiment.

FIG. 3 illustrates a diagram of the system architecture 300 using the trained model for the mono-camera modeling by supervised learning for the estimations of depth in images of the mono-camera depth estimation system in accordance with an embodiment.

FIG. 3 illustrates a path (1) for learning to estimate and predict a depth image (315) from a sequence of images and a path (2) for learning to estimate and predict a depth image from a radar (350). The mono-camera data of a 2D image in an input image $I_s$ 305 is received for estimating a corresponding depth image. The image $I_s$ may come directly from the raw camera output or be preprocess such as resized, enhanced etc. The input image $I_s$ 305 is fed into a prediction model 310 for estimating a depth image 315. Each pixel D(p) in 315 is the estimated depth of the corresponding pixel p in the input image 305. In order to make the prediction model 310 more robust to different cameras, it also takes the camera calibration parameters as the input which tries to learn the effect of the camera parameters during the training phase of the model. The depth image 315 for the entire image is generated with a matrix of pixels of depth points D(p).

In the second path, the image $I_s$ an imag $I_t$ are fed into another prediction model 340 to estimate the rotation and translation parameters 345 between the two images. These rotation and translation parameters are then combined with the estimated depth image 315 through path 343 to generate a warped image $\hat{I}_s$. The difference between the generated warp image $\hat{I}_s$ and the image $I_t$ 335 is then used as the supervision information to train the prediction model 310 and 340. Similar to prediction model 310, the prediction model 340 also takes the camera calibration information as one of the inputs in order to learn more robust models which are not sensitive to different cameras.

The third path shows how to use the radar information to assist the estimation of the depth. The depth image 315 is first converted into a representation of a 3-D point cloud 325, with the estimated rotation and translation parameters 345 from the source view to target view, the 3-D point cloud 325 in the source view is then converted to 3-D point cloud 365 in the target view. The 3-D point cloud 365 in the target view is then further transformed using the rotation and translation parameters 360 between camera sensor and radar sensor to distance measurement in the radar view $\hat{r}$. The transformed distance measurement $\hat{r}$ is then combined with the radar sensor data 340 received from a radar 350 to generate the supervision information which can also be used to learn the prediction model 310. Besides directly using the radar distance measurement to supervise the learning procedure, the radar doppler measurement can also be used to supervise the learning as well. It is also noted that the camera-radar rotation and translation parameters 360 is not learned but obtained in advance from the calibration procedure.

Figure 4:
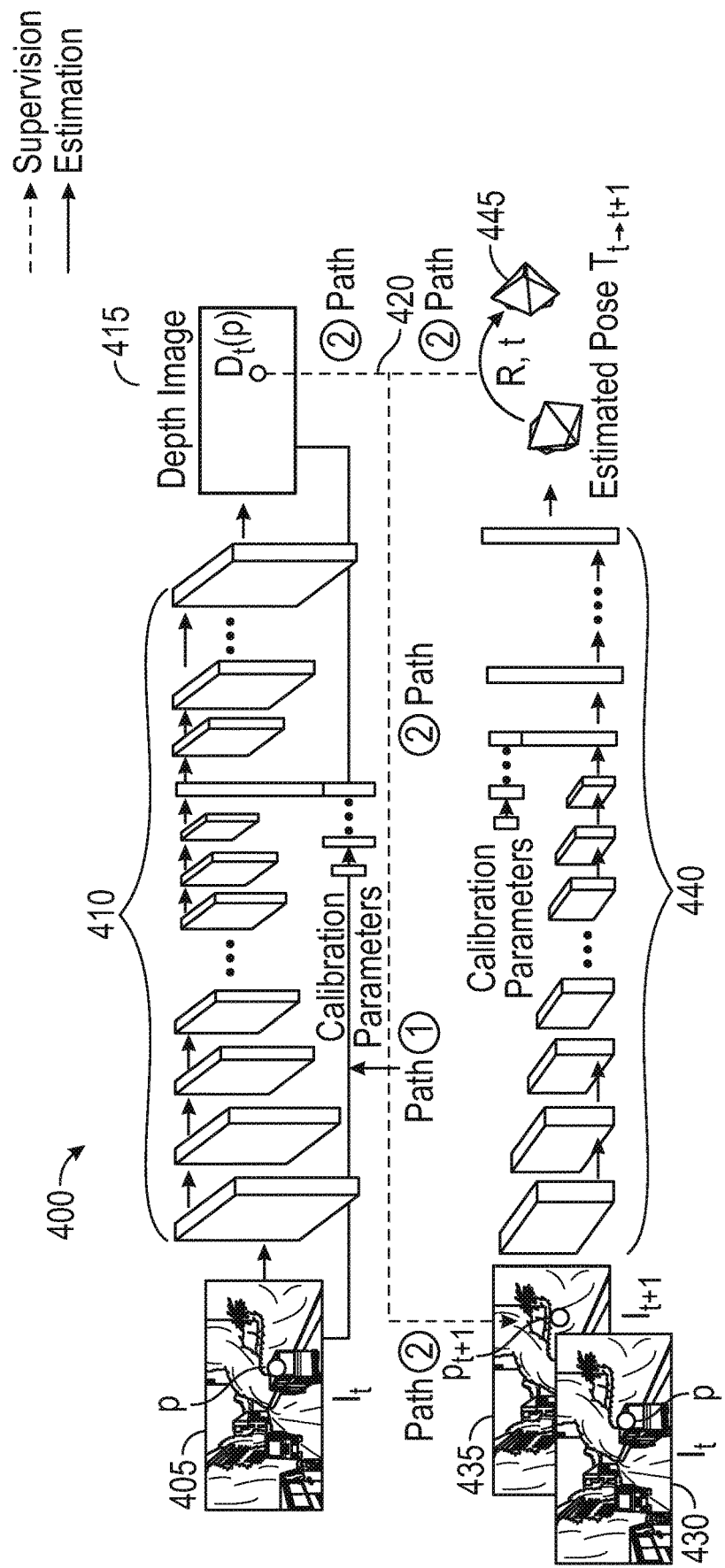
FIG. 4 illustrates a diagram of a synthesized view under supervision with no labeling and no association required of the mono-camera depth estimation system in accordance with an embodiment.

FIG. 4 illustrates a diagram of a synthesized view under supervision with no labeling and no association required of the mono-camera depth estimation system in accordance with an embodiment. In FIG. 4, the diagram 400 illustrates a source view 405 and a synthesis target view image 435 from a different camera pose to generate a model to predict image depth without a corresponding ground depth certainty in which to base a predicted image depth. Hence, to generate a synthetic image from the estimated image depth, it is necessary to reduce a difference between a synthetic image and a true image (i.e. captured or input image) from the camera as small as possible to enable a sufficient image estimation of the image depth (i.e. the actual image depth without error).

In training the model to estimate the image depth, in a path (1), in FIG. 4, from the source view 405 of an input image is sent through a prediction model 410 to estimate the depth of each pixel for the depth image 415. Next, in a second path, path (2) in FIG. 4, the source view image 430 which is the same as 405 and a target view image 435 captured at a different time than the source view image 430 are sent to a n prediction model to predict the rotation and translation parameters of the image from the source view $I_s$ to target view $I_t$. Once both the predicted depth image 415 and the rotation and translation parameters 445 $T_{s \rightarrow t}$ have been determined, a synthetic image $\hat{I}_s$ at 420 can be generated in the target view. If both the predicted depth and the rotation and translation parameters of the model are sufficient, the generated synthetic image $\hat{I}_s$ at 420 will be similar to the target view image 435. The difference between the synthetic image at 420 and the target view image at 435 can be used for training the supervision model. In order to enable the supervision model to be more robust and feasible for different cameras, the calibration parameters of the camera can be input during the training (for example, in the training of a neural network for the trained model 235 of FIG. 2).

The image sequence is denoted <$I_1$ to $I_N$> with one of the images as source view $I_s$ and the rest are target views s $I_t$ (1≤t≤N, s≠t), the loss is configured then as:

$$\ell_{vs} = \frac{1}{wh} \sum_t \sum_p |I_t(p) - \hat{I}_s(p)|$$

The parameter $\hat{I}_s$ is the source image $I_s$ warped to the target view based on the predicted depth image $\hat{D}_s$ and the predicted camera transformation R, T from the source view to target view.

Figure 5:
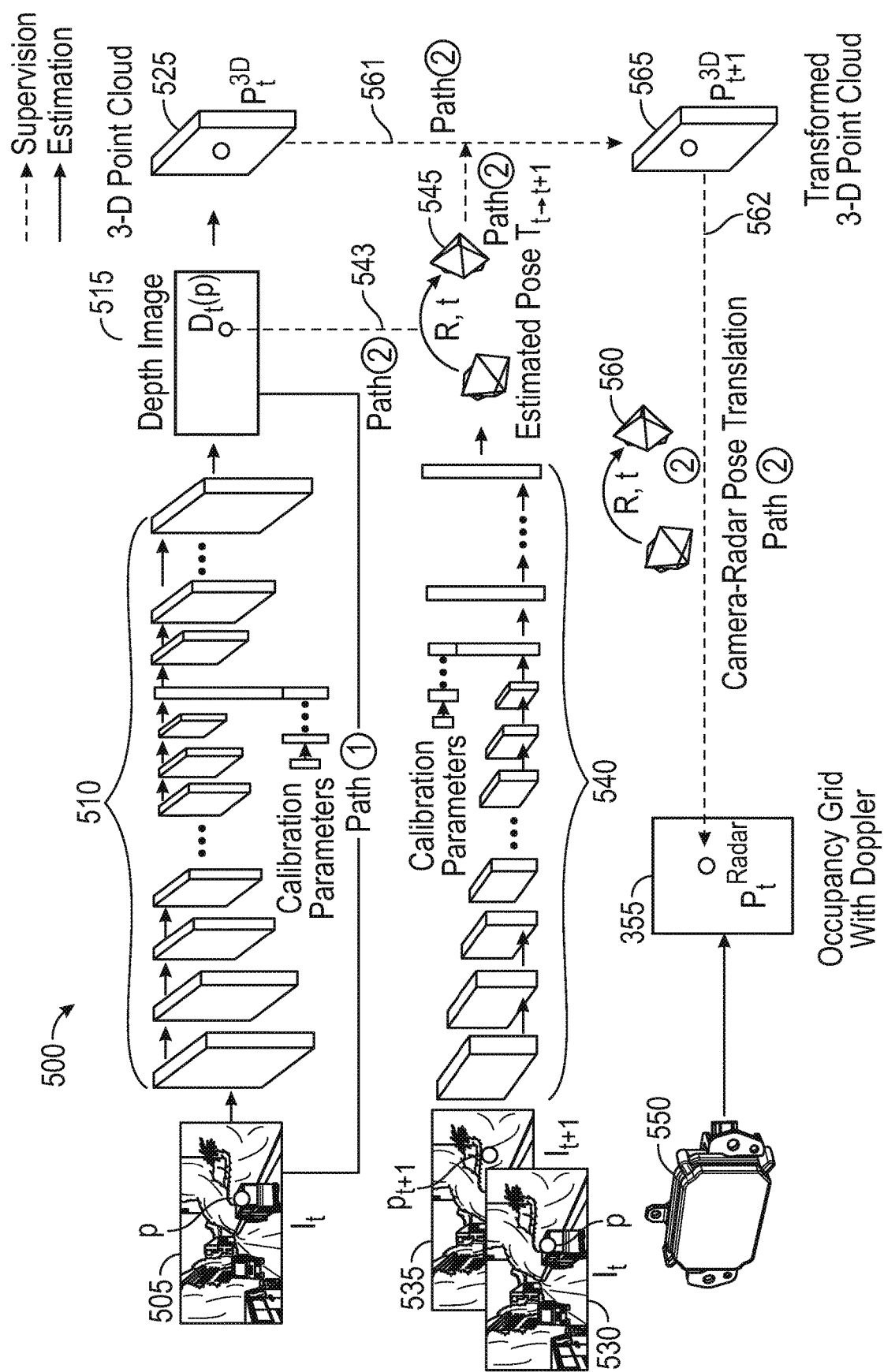
FIG. 5 illustrates a diagram of a synthesized view with supervision from radar range measurements and from radar doppler measurements of the mono-camera depth estimation system in accordance with an embodiment.

FIG. 5 illustrates a diagram of a synthesized view with supervision from radar range measurements and from radar doppler measurements of the mono-camera depth estimation system in accordance with an embodiment. In FIG. 5, the diagram 500 illustrates use of radar measurements to facilitate the learning of the estimated (i.e. predicted) depth image 515 of a source view input image 505. In FIG. 5, the radar 550 is able to directly measure the distance (i.e. the depth) and the range rate (i.e. doppler) to objects which are incorporated in supervised training of the estimating (i.e. predicting) depth image model. In FIG. 5, similar to FIG. 4, path (1) is the estimation model of depth image 515 via the prediction model 510 in order to ascertain by training, the depth of the source view input image 505 and to determine the rotation and translation parameters of the transform pose 545 of the source view images of image 530 (the same image as source view input image 505) and the target view image 535 which are captured at a different time than the source view image With the predicted depth images, the 3-D point cloud 525 can be derived for the source view input image 505. The 3-D point cloud 525 is then combined with the predicted rotation and translation parameters R and T 545 to generate a transformed 3-D point cloud 565 for the target.

The 3-D point cloud 565 for the target view is the camera view as a result of the radar sensor and the camera sensor not fixed at the exact same spot on the vehicle. This difference in view requires another rotation and translation of a transform pose 560 which can be estimated in advance using standard sensor calibration methods. The 3-D point cloud 565 is therefore transformed from the camera target view to the radar 550 target view. In addition, the 3-D point cloud 525 of the camera view at source view can also be transformed to the radar 550 vie. Therefore, two 3-D point clouds can be generated and the range rate (i.e. doppler) information $\hat{rr}$ can be estimated from the two 3-D point clouds.

The 3-D point cloud at the target view can be compared with the radar 550 measurements r of radar sensor data 540 with doppler 555 rr which showed in a top down view of occupancy grid with the transformed 3-D point cloud 565 transformed by transform pose 560. In various alternate embodiments, radars can be enabled to provide 3-D point cloud measurements without the need for an occupancy grid. The distance measurements of each corresponding point between the generated 3-D point cloud and radar measurements is similar, and the difference is incorporated in the training data for the supervised training in path (1). Next, the estimated (i.e. predicted) two 3-D point clouds 525 and 565 are used to derive the range rate information of the points which are close to the corresponding radar doppler measurements. The difference can also be used as supervision information during the training of the depth estimation model for the depth image 515.

The loss function for supervising the training of depth estimations from the radar range measurement is as follows:

$$\ell_{depth} = \frac{1}{n} \sum_x \sum_y \sum_{j \in \mathbb{N}} w_j(r_{xy} - \hat{r}_j)$$

Where n is the total radar points, each point in the radar occupancy grid is the range measurement r. ℕ is the neighborhood of point (x,y), $\hat{r}$ is corresponding estimated range from the image and w is the corresponding weights.

The loss for training the depth estimation from the radar range rate measurement is as follows:

$$\ell_{doppler} = \frac{1}{n} \sum_x \sum_y \sum_{j \in \mathbb{N}} w_j(rr_{xy} - \hat{rr}_j)$$

Where n is the total radar points, each point in the radar occupancy grid is the range rate rr, ℕ is the neighborhood of a point (x,y) $\hat{rr}$ is the corresponding estimated range rate from the image and $w_j$ is the corresponding weights.

The final loss is calculated for the radar data based on radar-based depth error calculations and/or radar doppler based error calculations for the supervised 3-$D^{3D}$ and camera-based depth error calculations as follows:

$$\ell_{final} = \alpha_1 \ell_{vs} + \alpha_2 \ell_{depth} + \alpha_3 \ell_{doppler} + \alpha_4 \ell_{smooth/reg}$$

A weighting scheme and smoothing regulation is applied to the global loss calculation. That is, in an exemplary embodiment, the $\ell_{smooth/reg}$ is the optional smooth regularization term, e.g. $l_1$ norm of the second order gradients of the predicted depth image and $\alpha_i$ is the weighting parameters for each component respectively.

Figure 6:
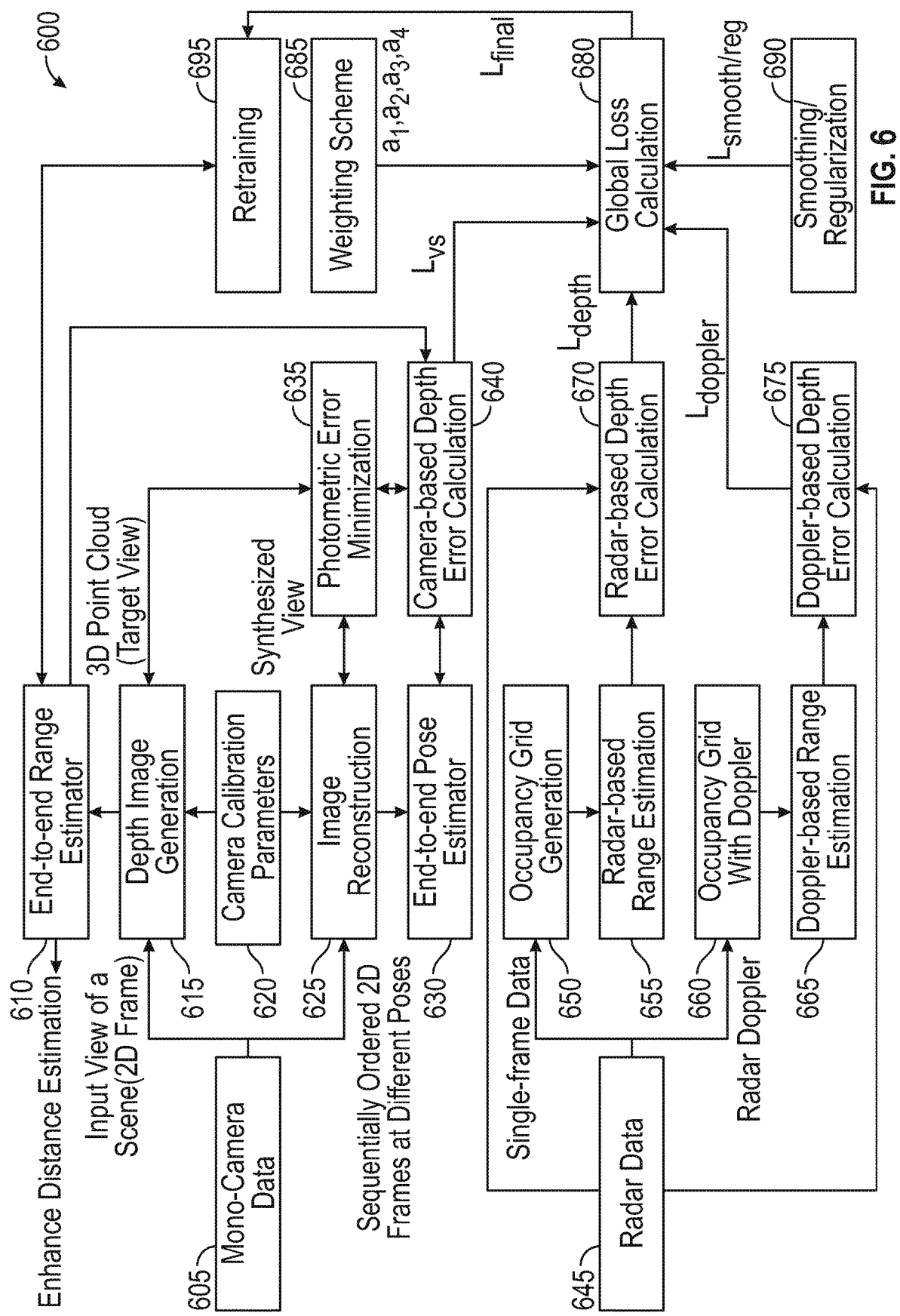
FIG. 6 illustrates a diagram of the final loss calculations for the self-supervised training model using error estimations from radar range measurements and radar doppler measurements and camera-based error depth calculations for enhanced distance estimations of the mono-camera depth estimation system in accordance with an embodiment.

FIG. 6 illustrates a diagram of the final loss calculations for the self-supervised training model using error estimations from radar range measurements and radar doppler measurements and camera-based depth calculations for enhanced distance estimations of the mono-camera depth estimation system in accordance with an embodiment. For the final loss modeling of diagram 600 of the mono-camera depth estimation system receives mono-camera data 605 which is sent as input of a view of a scene (i.e. 2-D frame) to the depth image generation unit 615 with inputs of the 3-D point cloud of the target view which are processed by a photometric error minimization unit 635 to minimize photometric error, and configured to the mono-camera calibration parameters 620. The depth image data which is a queue of sequentially ordered 2-D frames at different poses is received as an input to the image reconstruction unit 625. The image reconstruction unit 625 also receives camera calibration parameters from the camera calibration parameter unit 620 and an input of data of the synthesized view to send to the end to end pose estimator unit 630. Data from the end-to-end pose estimation unit 630 and from the end-to-end range estimator unit 610 is sent to the camera-based depth error calculation unit 640 to calculate a depth error $l_{vs}$.

Next, the radar data unit 645 sends radar doppler data to an occupancy gird with doppler unit 660. The occupancy grid with doppler unit 660 sends data to the doppler based range estimation unit 665 of range estimation. The single frame data is sent to the occupancy grid generation unit 650. The radar-based range estimation unity 655 receives grid data from the occupancy grid generation unit 650 and outputs estimations of range data to the radar-based depth error calculation unit 670. The radar-based depth error calculation unit 670 in addition receives radar data 645 and calculates radar-based depth loss $\ell_{depth}$ to send to the global loss calculation unit 680. The doppler data is received by the occupancy gird with doppler unit 660 and gird data is sent to the doppler based estimation unit 665. The doppler based range estimation unit 665 generates estimated range data for receipt by the doppler based depth error calculation unit 675. The doppler base range calculation unit in addition receives radar data 645 and calculates doppler loss $\hat{l}_{s\ doppler}$ to send to the global loss calculation unit 680.

The global loss calculation unit 680 receives both the amount of the radar loss depth error calculated and the amount of the doppler-based depth error calculated, and the amount of the camera based depth error calculated and sums all the calculated losses with a weighting scheme 685 and a smooth/regularization function 690 as follows:

$$\ell_{final} = \alpha_1 \ell_{vs} + \alpha_2 \ell_{depth} + \alpha_3 \ell_{doppler} + \alpha_4 \ell_{smooth/reg}$$

The model is then retrained 695 to send the final loss data $\ell_{final}$ to the end-to-end range estimator unit 610. The end-to-end range estimator unit 610 takes into account the final loss generates enhanced distance estimations.

Figure 7:
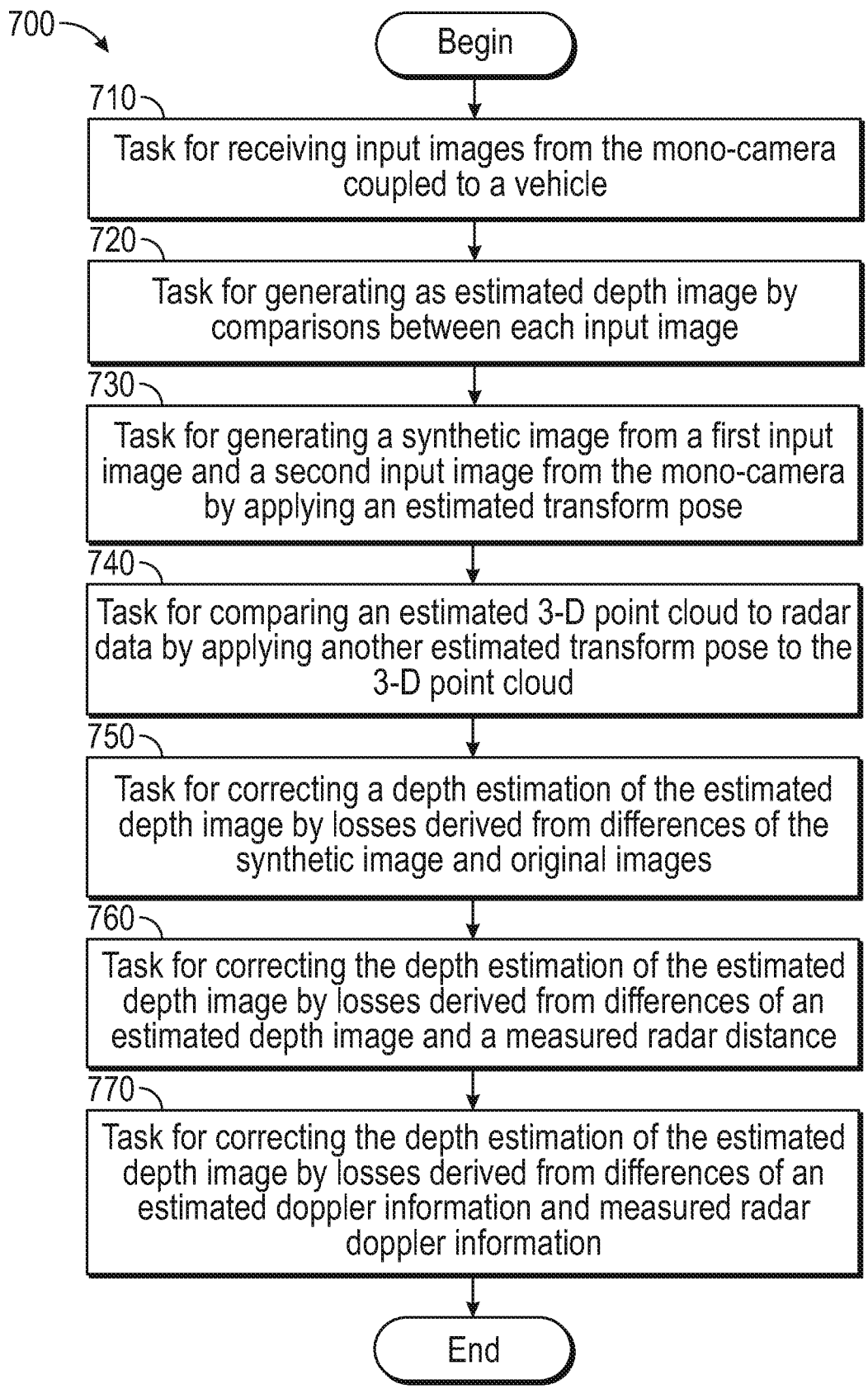
FIG. 7 illustrates a flowchart for correcting the depth estimation of the estimated depth image by losses of the mono-camera depth estimation system in accordance with an embodiment.

FIG. 7 illustrates a flowchart for correcting the depth estimation of the estimated depth image by losses of the mono-camera depth estimation system in accordance with an embodiment. The flowchart 700 includes: at 710 receiving, by a processing unit disposed in a vehicle, a plurality of input images from the mono-camera coupled to a vehicle wherein each input image is a 2-D image of a scene surrounding the vehicle. At 720, generating, by the processing unit, an estimated depth image by comparisons between each input image of a set of the plurality of the input images. At 730, generating, by the processing unit, a synthetic image from a first input image and a second input image from the mono-camera by applying an estimated transform pose. At 740, comparing, by the processing unit, an estimated 3-D point cloud to radar data by applying another estimated transform pose to the 3-D point cloud wherein the 3-D point cloud is estimated by supervised training of the image estimation model to radar distance and radar doppler measurement. At 750, correcting a depth estimation of the estimated depth image by losses derived from differences of the synthetic image and original images. At 760, correcting the depth estimation of the estimated depth image by losses derived from differences of an estimated depth image and a measured radar distance. At 770, correcting the depth estimation of the estimated depth image by losses derived from differences of an estimated doppler information and measured radar doppler information.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for enhanced depth estimation of images from a mono-camera by use of radar data, the method comprising:

receiving, by a processing unit disposed in a vehicle, a plurality of input images from the mono-camera coupled to a vehicle wherein each input image is a two-dimensional (2-D) image of a scene surrounding the vehicle;

generating, by the processing unit, an estimated depth image by supervised training of an image estimation model;

generating, by the processing unit, a synthetic image from a first input image and a second input image from the mono-camera by applying an estimated transform pose;

comparing, by the processing unit, an estimated three-dimensional (3-D) point cloud to radar data by applying another estimated transform pose to a 3-D point cloud wherein the 3-D point cloud is estimated from a depth image by supervised training of the image estimation model to radar distance and radar doppler measurement;

correcting a depth estimation of the estimated depth image by losses derived from differences of the synthetic image and original images;

correcting the depth estimation of the estimated depth image by losses derived from differences of an estimated depth image and a measured radar distance; and correcting the depth estimation of the estimated depth image by losses derived from differences of an estimated doppler information and measured radar doppler information wherein the first input image is a source view selected from a set comprising a sequence of n images of source views and the second input image is a target view selected from a set of N images of target views wherein the source view has a different pose than the target view.

2. The method of claim 1, wherein the first input image is the source view $I_s$ between $<I_1, \ldots I_n>$ and the second input image is the target view of $I_t$ ($1 \le t \le N$, $s \ne t$).

3. The method of claim 2, further comprising:
correcting the depth estimation by calculating the loss from a depth error of the input image derived by the function of:

$$\ell_{vs} = \frac{1}{wh} \sum_t \sum_p |I_t(p) - \widehat{I_s}(p)|$$

wherein $\widehat{I_s}$ is the source view $I_s$ warped to the target view based on an estimated depth image of an estimated depth $\widehat{D_s}$ and an estimated transform pose R, T of the source view image and target view images.

4. The method of claim 3, further comprising:
correcting the depth estimation by calculating the loss from a radar depth error derived by a function of:

$$\ell_{depth} = \frac{1}{n} \sum_x \sum_y \sum_{j \in \mathbb{N}} w_j(r_{xy} - \hat{r}_j)$$

wherein n is a total number of radar points compared to each point of the 3-D point cloud wherein $\mathbb{N}$ is a neighborhood of (x, y), r is a measured distance from a radar sensor and $\hat{r}$ is the estimated image depth in the neighborhood wherein w is a corresponding weight.

5. The method of claim 4, further comprising:
correcting the depth estimation by calculating the loss from a radar doppler error.

6. The method of claim 5, further comprising:
calculating the loss of the radar doppler error derived by a function of:

$$\ell_{doppler} = \frac{1}{n} \sum_x \sum_y \sum_{j \in \mathbb{N}} w_j(rr_{xy} - \widehat{rr}_j)$$

wherein n is a total number of radar points compared to the 3-D point cloud wherein N is the neighborhood of (x, y), rr is a measured radar doppler information and $\widehat{rr}$ is an estimated doppler information in the neighborhood wherein w is the corresponding weight.

7. The method of claim 6, further comprising:
correcting the depth estimation by calculating the loss derived by a function of: $\ell_{final} = \alpha_1 \ell_{vs} + \alpha_2 \ell_{depth} + \alpha_3 \ell_{doppler} + \alpha_4 \ell_{smooth/reg}$ wherein $\ell_{smooth/reg}$ is a smooth regularization term, and $\alpha_i$ is a weighting parameter.

8. The method of claim 7, wherein $\ell_{smooth/reg}$ is an optional term.

9. A system comprising:
a depth estimation processing unit disposed in a vehicle comprising one or more processors configured by programming instructions encoded on non-transient computer readable media, the depth estimation processing unit configured to:
receive a plurality of input images from a mono-camera coupled to the vehicle wherein each input image is a two-dimensional (2D) image of a scene surrounding the vehicle;
generate an estimated depth image by supervised training of an image estimation model;
generate a synthetic image from a first input image and a second input image from the mono-camera by applying an estimated transform pose;
compare an estimated three-dimensional (3-D) point cloud to radar data from a radar of the vehicle by applying another estimated transform pose to a 3-D point cloud wherein the 3-D point cloud is estimated from a depth image by supervised training of the image estimation model to radar distance and a radar doppler measurement; and
correct a depth estimation of the estimated depth image by losses derived from differences of: the synthetic image and original images, an estimated depth image and a measured radar distance, and an estimated doppler information and measured radar doppler information wherein the first input image is a source view selected from a set comprising a sequence of n images of source views and the second input image is a target view selected from a set of N images of target views wherein the source view has a different pose than the target view.

10. The system of claim 9, wherein the first input image is the source view $I_s$ between $<I_1, \ldots I_n>$ and the second input image is the target view of $I_t$ ($1 \le t \le N$, $s \ne t$).

11. The system of claim 10, further comprising:
correct the depth estimation by calculating the loss from a depth error of the input image derived by the function of:

$$\ell_{vs} = \frac{1}{wh} \sum_t \sum_p |I_t(p) - \widehat{I_s}(p)|$$

wherein $\widehat{I_s}$ is the source view $I_s$ warped to the target view based on an estimated depth image of an estimated depth $\widehat{D_s}$ and an estimated transform pose R, T of the first input image and the target view images.

12. The system of claim 11, further comprising:
correct the depth estimation by calculating the loss from a radar depth error derived by a function of:

$$\ell_{depth} = \frac{1}{n} \sum_x \sum_y \sum_{j \in \mathbb{N}} w_j(r_{xy} - \hat{r}_j)$$

wherein n is a total number of radar points compared to each point of the 3-D point cloud wherein $\mathbb{N}$ is a neighborhood of (x, y), r is a radar distance measurement and an $\hat{r}$ is the estimated image depth wherein w is a corresponding weight.

13. The system of claim 12, further comprising:
correct the depth estimation by calculating the loss from a radar doppler error.

14. The system of claim 13, further comprising:
calculate the loss of the radar doppler error derived by a function of:

$$\ell_{doppler} = \frac{1}{n}\sum_x \sum_y \sum_{j\in\mathbb{N}} w_j(rr_{xy} - \widehat{rr}_j)$$

wherein n is a total number of radar points compared to the 3-D point cloud wherein $\mathbb{N}$ is the neighborhood of (x, y), rr is a measured doppler information from radar and $\widehat{rr}$ is an estimated doppler information wherein w is the corresponding weight.

15. The system of claim 14, further comprising:
correct the depth estimation by calculating the loss derived by a function of: $\ell_{final} = \alpha_1 \ell_{vs} + \alpha_2 \ell_{depth} + \alpha_3 \ell_{doppler} + \alpha_4 \ell_{smooth/reg}$ wherein $\ell_{smooth/reg}$ is a smooth regularization term, and $\alpha_i$ is a weighting parameter.

16. The system of claim 15, wherein $\ell_{smooth/reg}$ is an optional term.

17. A vehicle, comprising a mono-camera, a radar and a depth estimation unit comprising one or more processors and non-transient computer readable media encoded with programming instructions, the depth estimation unit is configured to:
receive a plurality of input images from a mono-camera coupled to the vehicle wherein each input image is a two-dimensional (2-D) image of a scene surrounding the vehicle;
generate an estimated depth by supervised training of an image estimation model;
generate a synthetic image from a first input image and a second input image from the mono-camera by applying an estimated transform pose;
compare an estimated three-dimensional (3-D) point cloud to radar data from the radar by applying another estimated transform pose to a 3-D point cloud wherein the 3-D point cloud is estimated from a depth image by supervised training of the image estimation model to radar distance and radar doppler measurements;
correct a depth estimation of the estimated depth image by losses derived from differences of the synthetic image and original images;
correct the depth estimation of the estimated depth image by losses derived from differences of an estimated depth image and a measured radar distance; and
correct the depth estimation of the estimated depth image by losses derived from differences of an estimated doppler information and measured radar doppler information wherein the first input image is a source view selected from a set comprising a sequence of n images of source views and the second input image is a target view selected from a set of N images of target views wherein the source view has a different pose than the target view.

18. The vehicle of claim 17, further comprising:
the depth estimation unit is configured to:
correct the depth estimation by calculating the loss from a depth error of the input image derived by the function of:

$$\ell_{vs} = \frac{1}{wh}\sum_t \sum_p |I_t(p) - \widehat{I_s}(p)|$$

wherein $\widehat{I_s}$ is a source view $I_s$ warped to a target view based on an estimated depth image of an estimated depth $\widehat{D_s}$ and an estimated transform pose R, T of the first input image and a source view wherein the first input image is the source view $I_s$ between $\langle I_1, \ldots I_n \rangle$ and the second input image is the source view of $I_t$ ($1 \le t \le N$, $s \ne t$).

19. The vehicle of claim 18, further comprising:
the depth estimation unit is configured to:
correct the depth estimation by:
calculating the loss from a depth error of the input image derived by the function of:

$$\ell_{vs} = \frac{1}{wh}\sum_t \sum_p |I_t(p) - \widehat{I_s}(p)|$$

wherein $\widehat{I_s}$ is the source view $I_s$ warped to the target view based on an estimated depth image of an estimated depth $\widehat{D_s}$ and an estimated transform pose R, T of source view image and the target view images;
calculating the loss from a radar depth error derived by a function of:

$$\ell_{depth} = \frac{1}{n}\sum_x \sum_y \sum_{j\in\mathbb{N}} w_j(r_{xy} - \hat{r}_j)$$

wherein n is a total number of radar points compared to each point of the 3-D point cloud wherein $\mathbb{N}$ is a neighborhood of (x, y), r is a measured distance from a radar sensor and $\hat{r}$ is the estimated image depth wherein w is a corresponding weight; and
calculating the loss of the doppler radar depth error derived by a function of:

$$w\ell_{doppler} = \frac{1}{n}\sum_x \sum_y \sum_{j\in\mathbb{N}} w_j(rr_{xy} - \widehat{rr}_j)$$

herein n is a total number of radar points compared to the 3-D point cloud wherein N is the neighborhood of (x, y), rr is a measured doppler information from a radar sensor and $\widehat{rr}$ is an estimated doppler information wherein w is the corresponding weight.

20. The vehicle of claim 19, further comprising:
the depth estimation unit is configured to:
correct the depth estimation by:
calculating a total loss by the function $\ell_{final} = \alpha_1 \ell_{vs} + \alpha_2 \ell_{depth} + \alpha_3 \ell_{doppler} + \alpha_4 \ell_{smooth/reg}$ wherein $\ell_{smooth/reg}$ is a smooth regularization term, and $\alpha_i$ are weighting parameters wherein $\ell_{smooth/reg}$ is an optional term.

* * * * *